(12) United States Patent
Fan et al.

(10) Patent No.: US 8,054,636 B2
(45) Date of Patent: Nov. 8, 2011

(54) MOUNTING STRUCTURE FOR DATA STORAGE DEVICE

(75) Inventors: Chen-Lu Fan, Taipei Hsien (TW); Hung-Chieh Chang, Taipei Hsien (TW); Li-Ping Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 719 days.

(21) Appl. No.: 12/199,550

(22) Filed: Aug. 27, 2008

(65) Prior Publication Data

US 2010/0014258 A1 Jan. 21, 2010

(30) Foreign Application Priority Data

Jul. 16, 2008 (CN) .................. 2008 2 0301528 U

(51) Int. Cl.
*H05K 5/00* (2006.01)

(52) U.S. Cl. .................................. 361/732; 361/679.39

(58) Field of Classification Search .............. 361/732, 361/679.37, 679.39
See application file for complete search history.

(56) References Cited

U.S. PATENT DOCUMENTS

| | | | | |
|---|---|---|---|---|
| 6,018,457 A * | 1/2000 | Mroz | | 361/679.31 |
| 6,639,151 B1 * | 10/2003 | Chen et al. | | 174/666 |
| 6,667,880 B2 * | 12/2003 | Liu et al. | | 361/679.35 |
| 6,693,800 B1 * | 2/2004 | Lin et al. | | 361/759 |
| 6,738,261 B2 * | 5/2004 | Vier et al. | | 361/740 |
| 6,813,148 B2 * | 11/2004 | Hsu et al. | | 361/679.39 |
| 7,035,099 B2 * | 4/2006 | Wu | | 361/679.33 |
| 7,036,783 B2 * | 5/2006 | Chen et al. | | 248/298.1 |
| 7,102,885 B2 * | 9/2006 | Chen et al. | | 361/679.31 |
| 7,184,261 B2 * | 2/2007 | Chung | | 361/679.56 |
| 7,277,279 B2 * | 10/2007 | Chen et al. | | 361/679.33 |
| 7,299,933 B2 * | 11/2007 | Chen et al. | | 211/26 |
| 7,365,969 B2 * | 4/2008 | Chung | | 361/679.55 |
| 7,447,046 B2 * | 11/2008 | Huang et al. | | 361/810 |
| 7,450,376 B2 * | 11/2008 | Chen et al. | | 361/679.33 |
| 7,489,504 B2 * | 2/2009 | Chen et al. | | 361/679.37 |
| 7,495,903 B2 * | 2/2009 | Chen et al. | | 361/679.31 |
| 7,511,952 B2 * | 3/2009 | Chen et al. | | 361/679.33 |
| 7,518,857 B2 * | 4/2009 | Chen et al. | | 361/679.33 |
| 7,523,901 B2 * | 4/2009 | Wu et al. | | 248/225.21 |
| 7,697,279 B2 * | 4/2010 | Yeh et al. | | 361/679.39 |
| 7,715,185 B2 * | 5/2010 | Zhang et al. | | 361/679.37 |
| 7,753,325 B2 * | 7/2010 | Lin et al. | | 248/222.11 |
| 7,760,495 B2 * | 7/2010 | Li | | 361/679.37 |
| 7,813,136 B2 * | 10/2010 | Liu | | 361/727 |
| 2002/0006030 A1 * | 1/2002 | Evanson et al. | | 361/724 |
| 2007/0127204 A1 * | 6/2007 | Muenzer et al. | | 361/685 |
| 2007/0217143 A1 * | 9/2007 | Wagatsuma et al. | | 361/685 |
| 2008/0000849 A1 * | 1/2008 | Zhang et al. | | 211/26.2 |

* cited by examiner

*Primary Examiner* — Lisa Lea Edmonds
(74) *Attorney, Agent, or Firm* — Altis Law Group, Inc.

(57) ABSTRACT

A mounting structure is used for mounting a first data storage device or a second data storage device. A first guiding tab is formed on a side surface of the second data storage device. A second guiding tab is formed on a side surface of the second data storage device. A height of the first guiding tab from a bottom surface of the first data storage device is different than a height of the second guiding tab from a bottom surface of the second data storage device. The mounting structure includes a bracket and a sliding member. The bracket includes a side wall. A flange is formed on an edge of the side wall. A first guiding slot is defined in the side wall and extends to the flange to define a first guiding entry. A second guiding slot is defined in the side wall and extends to the flange to define a second guiding entry. The sliding member is slidably attached to the flange.

17 Claims, 6 Drawing Sheets

MOUNTING STRUCTURE FOR DATA STORAGE DEVICE

BACKGROUND

1. Technical Field

The present invention relates to a mounting structure and, more particularly, to a mounting structure for data storage device.

2. Description of Related Art

Data storage devices are continually improving. With the development of computing technology, many new types of storage devices have improved communication interfaces, larger capacities, and are smaller in size. These new types of data storage devices are usually placed in a single storage server to enlarge storage capacity. Different types of data storage devices may be assembled in the single storage server. Occasionally, when data storage devices are integrated into the storage server, different types of data storage devices may inadvertently be placed in erroneous positions. This creates a mismatched interface communication between the data storage devices and a circuit board of the storage server, and potentially leading to a failure of the data storage devices and the circuit board.

Therefore, a mounting structure to fix a data storage device in a computer is desired to overcome the above-described shortcomings.

DETAILED DESCRIPTION OF THE EMBODIMENTS

Figure 1:
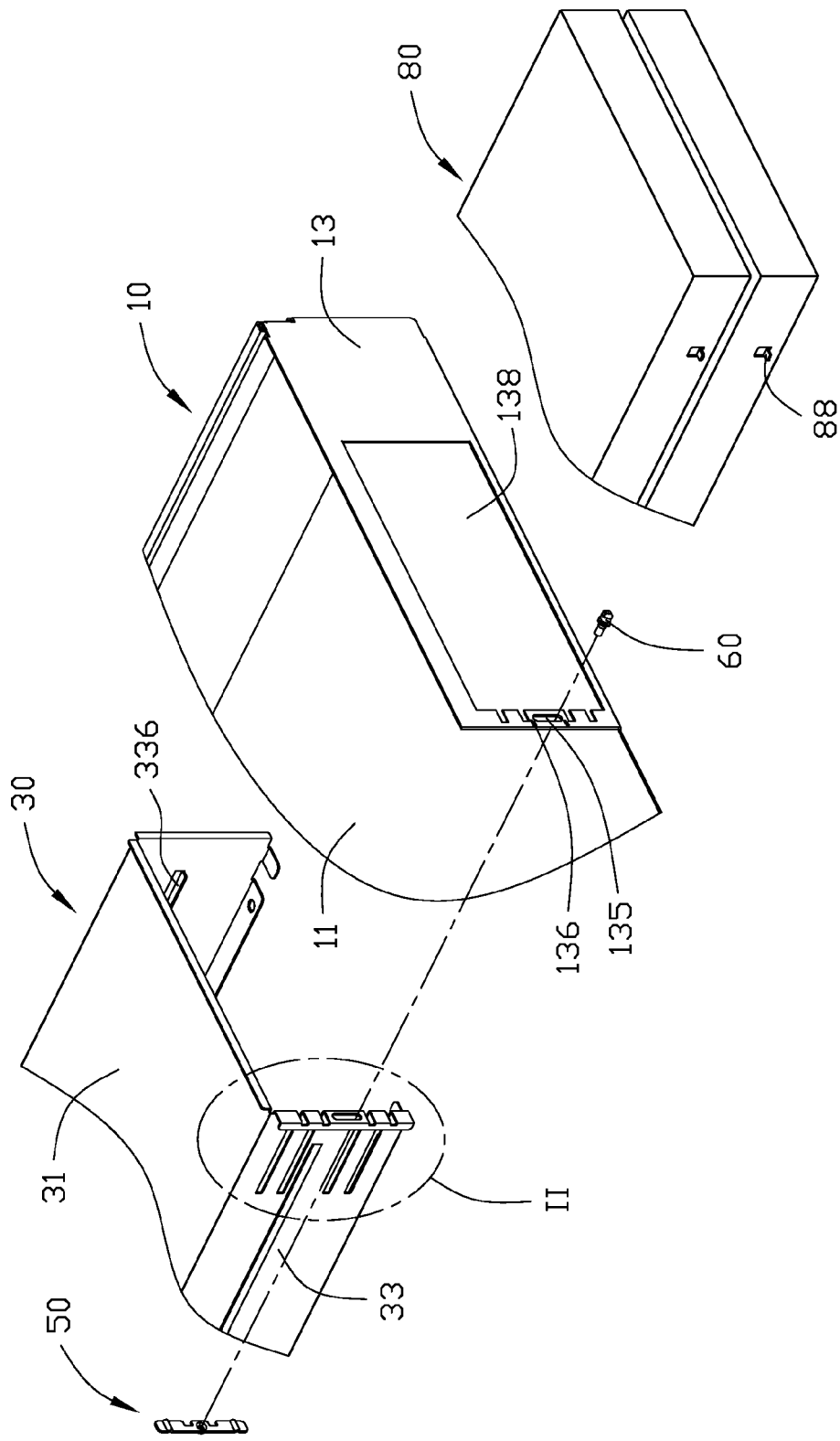
FIG. 1 is a partial isometric, exploded view of an embodiment of a mounting structure for data storage devices, the mounting structure includes an enclosure, a bracket, a sliding member, and a fastener.

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

Figure 6:
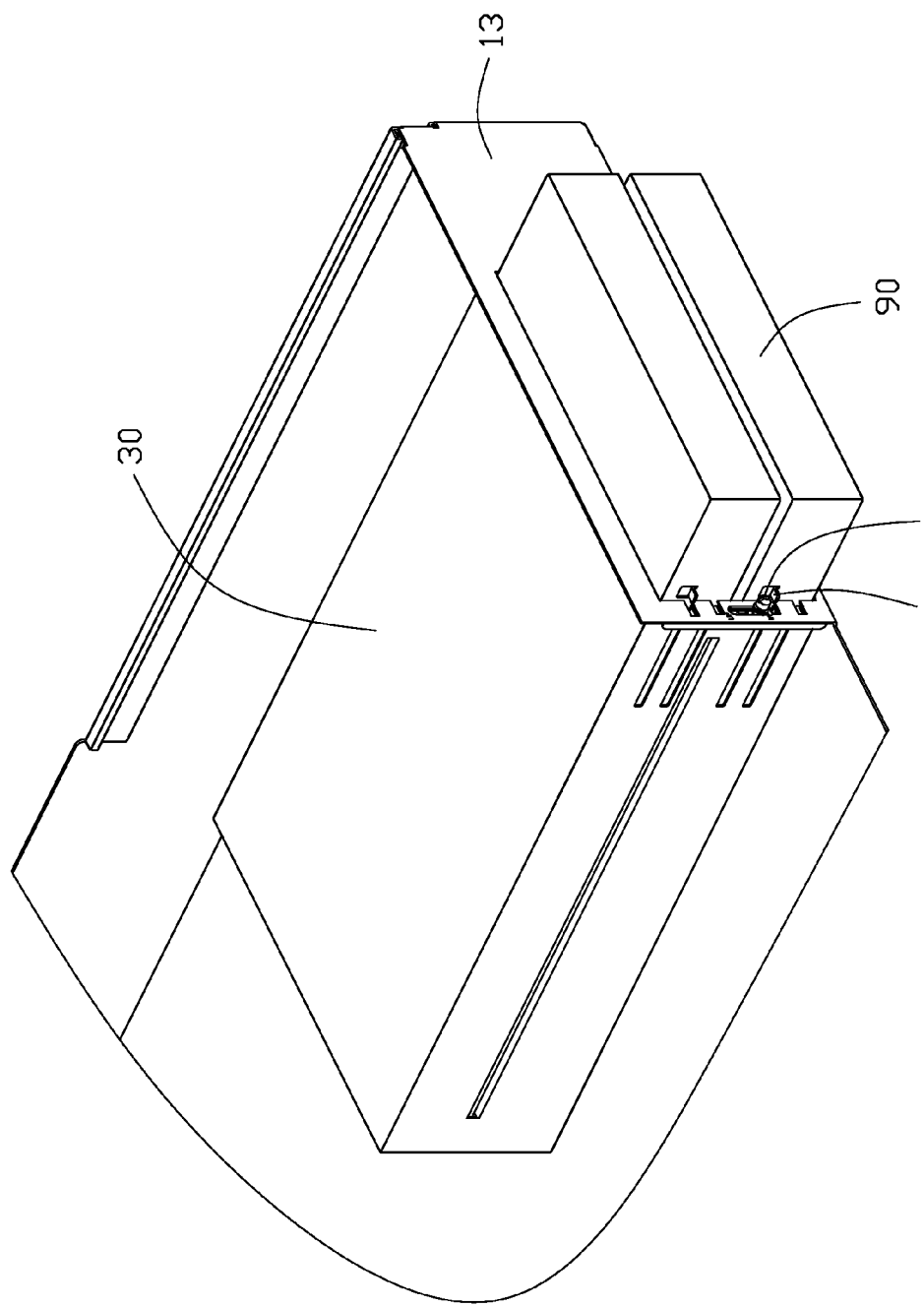
FIG. 6 is an assembled view of the mounting structure of FIG. 4, assembled with second data storage devices.

Referring to FIG. 1, an embodiment of a mounting structure is used for mounting at least one first data storage device 80 or at least one second data storage device 90 (as shown in FIG. 6). A first guiding tab 88 is formed on a side surface of the first data storage device 80. A second guiding tab 98 is formed on a side surface of the second data storage device 90. A height of each first guiding tab 88 from a bottom surface of the first data storage device 80 is less than a height of the second guiding tab 98 from a bottom surface of each second data storage device 90. The mounting structure includes an enclosure 10, a bracket 30, a sliding member 50, and a fastener 60.

The enclosure 10 includes a bottom panel 11 and a front panel 13 extending from an edge the bottom panel 11. An assembly opening 138 for receiving the at least one first data storage device 80 or the at least one second data storage device 80 is defined in the front panel 13. An outer slot 135 adjacent the assembly opening 138 is defined on the front panel 13. Two labels 136 are positioned at opposite sides of the outer slot 135 to indicate an assembling state.

The bracket 30 includes a top wall 31 with two parallel side walls 33 extending perpendicularly from opposite edges of the top wall 31. A receiving space is cooperatively formed by the top wall 31 and the two side walls 33. A rail 336 is formed on an inner surface of each side wall 33 for supporting the data storage device.

Figure 2:
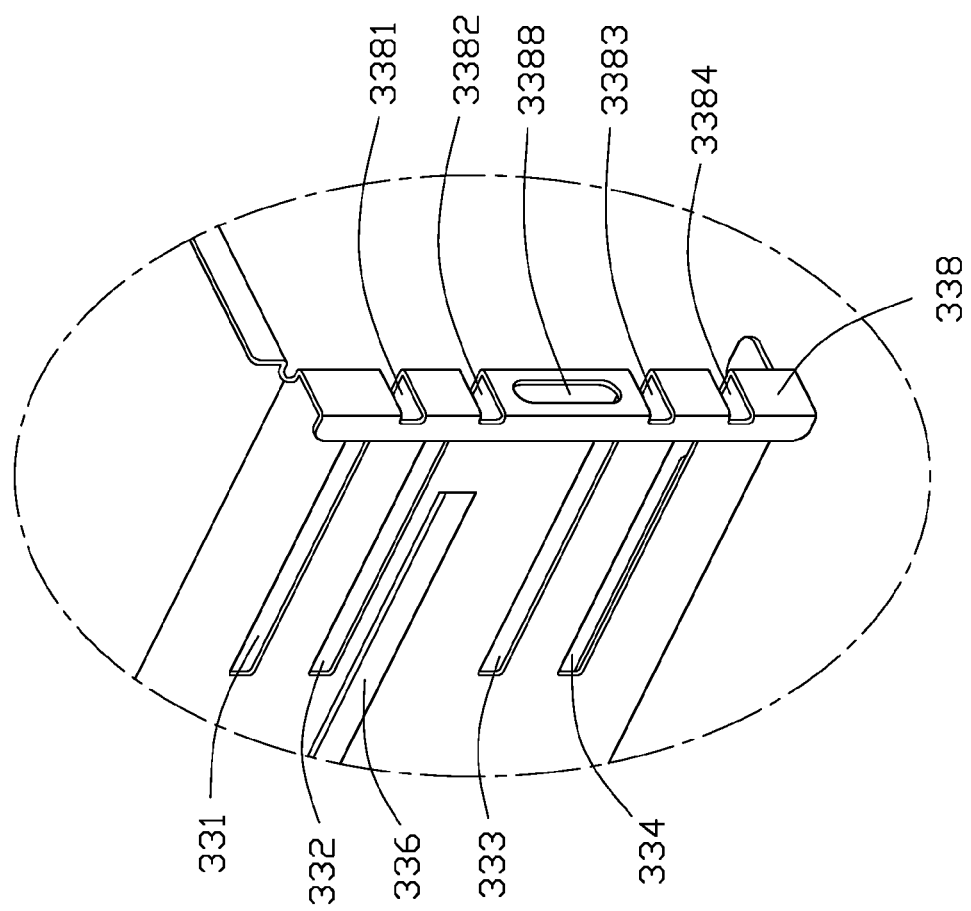
FIG. 2 is a partial enlarged view of the mounting structure of FIG. 1 circled in II.

Referring also to FIG. 2, a flange 338 extends out from a front edge of the side wall 33. A first guiding slot 331, a second guiding slot 332, a third guiding slot 333 and a fourth guiding slot 334 are defined in the side wall 33 in parallel. The first guiding slot 331, the second guiding slot 332, the third guiding slot 333 and the fourth guiding slot 334 extend to the flange 338 to respectively define a first guiding entry 3381, a second guiding entry 3382, a third guiding entry 3383 and a fourth guiding entry 3384. A long guiding slot 3388 is defined in the flange 338 between the second guiding entry 3382 and the third guiding entry 3383.

Figure 3:
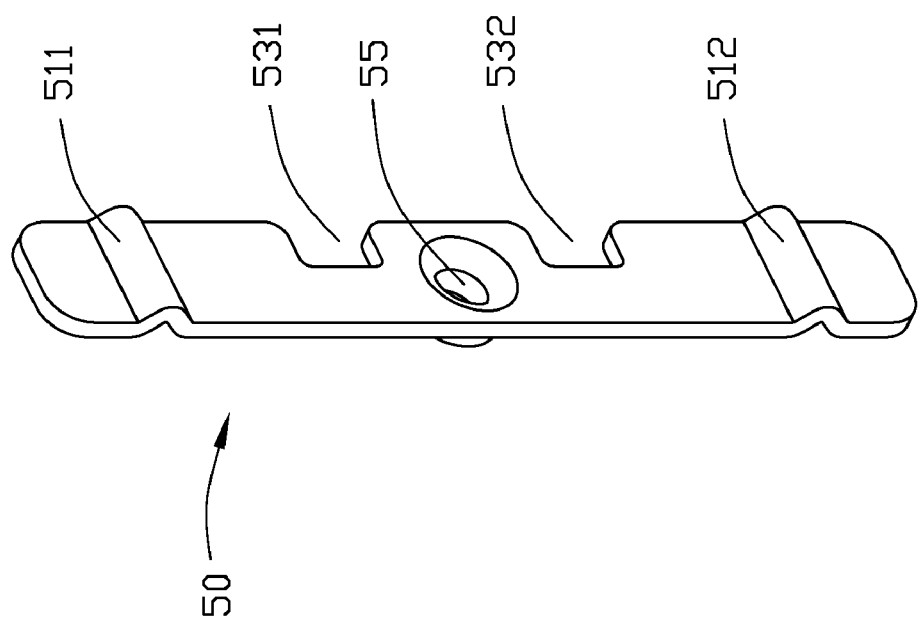
FIG. 3 is an isometric view of the sliding member of the mounting structure of FIG. 1.

Referring to FIG. 3, the sliding member 50 is configured to a sheet. A through hole 55 is defined in a middle portion of the sliding member 50. A first cutout 531 and a second cutout 532 are defined at a side edge of the sliding member 50. A first protruding portion 511 and a second protruding portion 512 are formed on opposite sides of the sliding member 50.

Figure 4:
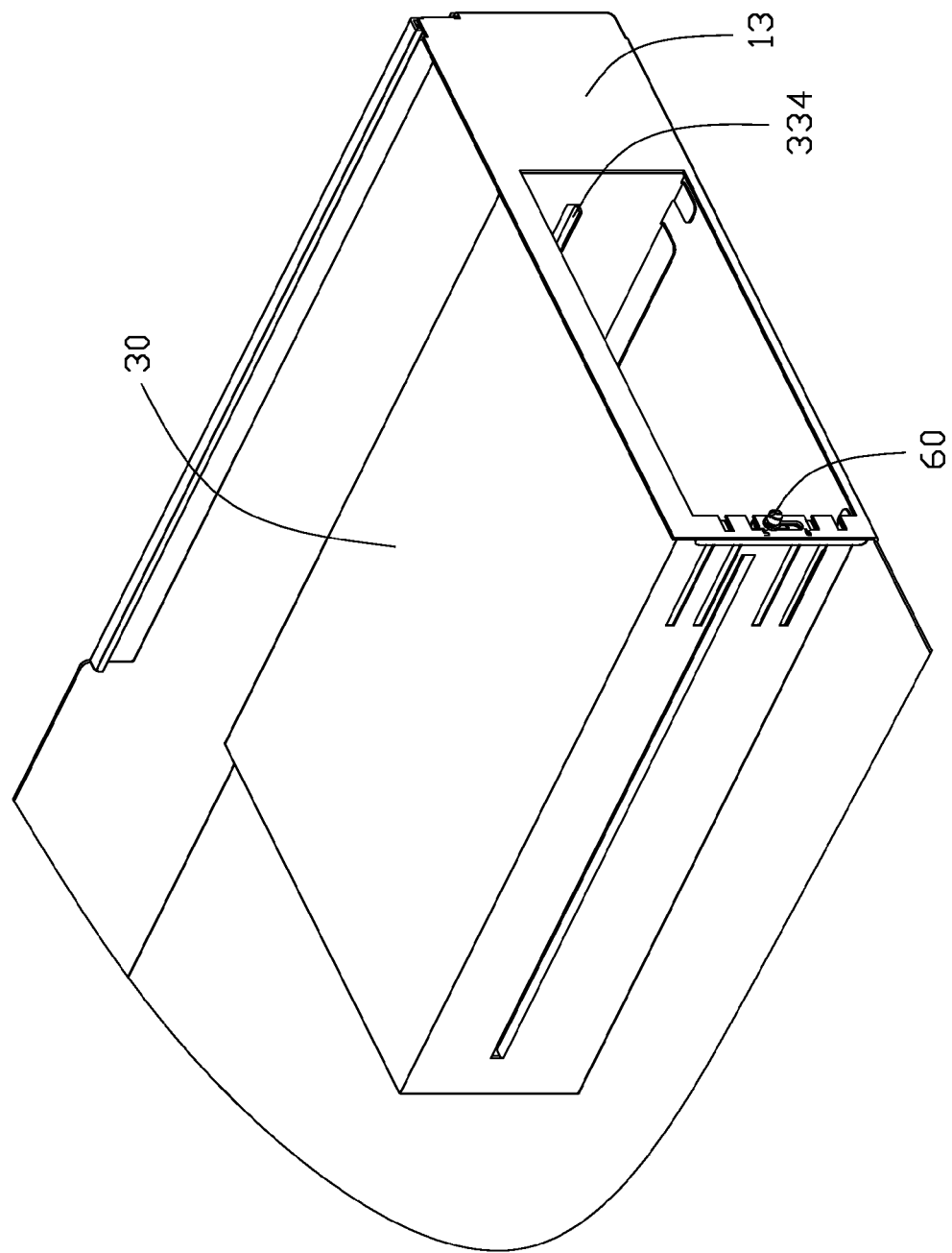
FIG. 4 is an assembled view of the mounting structure of FIG. 1.

Referring also to FIG. 4, the bracket 30 is mounted in the enclosure 10 with the receiving space communicating with the assembly opening 138 and the flange 338 abutting against the front panel 13. The fastener 60 is inserted through the outer slot 135, the guiding slot 3388, and the through hole 55 to attach the sliding member 50 to a back surface of the flange 338. The sliding member 50 is configured for moving along the direction and within a range of the guiding slot.

Figure 5:
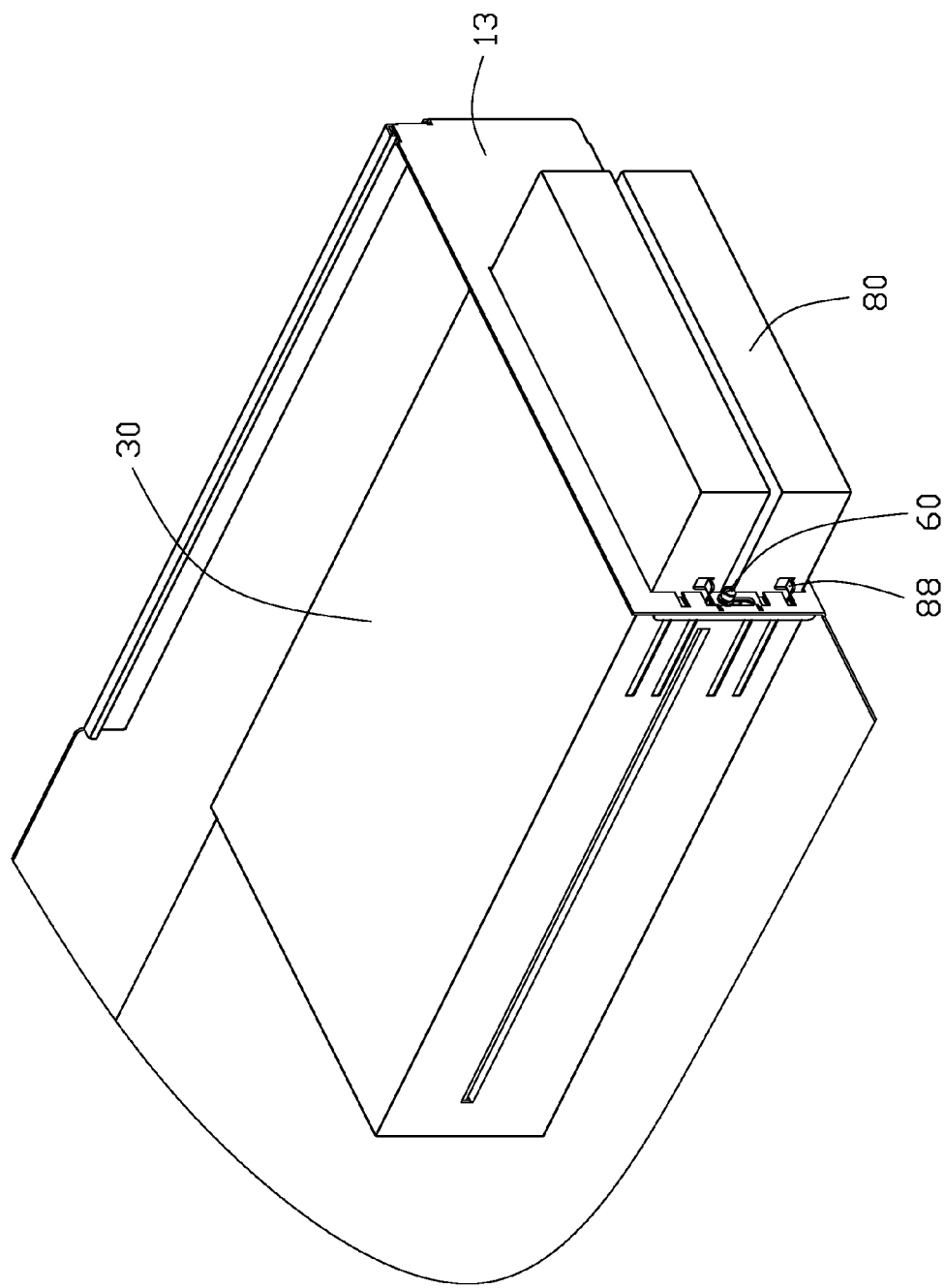
FIG. 5 is an assembled view of the mounting structure of FIG. 4, assembled with first data storage devices.

Referring also to FIG. 5, the first data storage devices 80 are integrated into the mounting structure, the sliding member 50 is slid into a first position by sliding the sliding member 50 until the first protruding portion 511 blocks the first guiding entry 3381, the second protruding portion 512 blocks the third guiding entry 3383, the first cutout 531 is aligned with the second guiding entry 3382, and the second cutout 532 is aligned with the fourth guiding entry 334. Each of the first data storage devices 80 may slide into the receiving space of the bracket 30 by guiding the first guiding tab 88 into either the second guiding slot 332 through the second guiding entry 3382 or the fourth guiding slot 334 through the fourth guiding entry 3384. Thus, two first data storage devices 80 of the same type may be assembled in the bracket 30.

Referring also to FIG. 6, the second data storage devices 90 are integrated into the bracket 30, the sliding member 50 is slid into a second position by sliding the sliding member 50 until the first protruding portion 511 blocks the second guiding entry 3382, the second protruding portion 512 blocks the fourth guiding entry 3384, the first cutout 531 is aligned with the first guiding entry 3381, and the second cutout 532 is aligned with the third guiding entry 3383. Each of the second data storage devices 90 may slide into the receiving space of the bracket by guiding the second guiding tab 98 into either the first guiding slot 331 through the first guiding entry 3381 or the third guiding slot 333 through the third guiding entry 3383. Thus, two second data storage devices 80 of the same type may be assembled in the bracket 30.

In one embodiment, when the sliding member 50 is in the first position, the first data storage device 80 is permitted to slide into the bracket 30. When the sliding member 50 is in the second position, the second data storage device 90 is permitted to slide into the bracket 30. Thus, the data storage devices can no longer be inadvertently installed in erroneous positions.

It is to be understood, however, that even though numerous characteristics and advantages of the present embodiments have been set forth in the foregoing description, together with details of the structure and function of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A mounting structure for mounting a first data storage device or a second data storage device, a first guiding tab formed on a side surface of the first data storage device, and a second guiding tab formed on a side surface of the second data storage device, a height of the first guiding tab from a bottom surface of the first data storage device different than a height of the second guiding tab from a bottom surface of the second data storage device, the mounting structure comprising:

a bracket comprising a side wall, a flange formed on an edge of the side wall, a first guiding slot defined in the side wall and extending to the flange to define a first guiding entry, a second guiding slot defined in the side wall and extending to the flange to define a second guiding entry; and a sliding member slidably attached to the flange, wherein upon the condition the sliding member is positioned in a first position, the first guiding entry is blocked by the sliding member to prevent the second guiding tab from sliding into the bracket, and the second guiding entry is capable of receiving the first guiding tab into the second guiding slot to mount the first data storage device in the bracket.

2. The mounting structure of claim 1, further comprising a fastener, wherein the sliding member is attached to a side of the flange by the fastener.

3. The mounting structure of claim 2, wherein a long guiding slot is defined in the flange to receive the fastener; the long guiding slot is configured for allowing the sliding member to slide along the slot.

4. The mounting structure of claim 3, wherein a label is positioned on the flange adjacent to each distal end of the guiding slot.

5. The mounting structure of claim 1, wherein a first protruding portion is formed on the sliding member to block the first guiding entry in the first position; a first cutout is defined in the sliding member to align with the second guiding entry in the first position.

6. The mounting structure of claim 1, wherein a third guiding slot is defined in the side wall and extends to the flange to define a third guiding entry, a fourth guiding slot is defined in the side wall and extends to the flange to define a fourth guiding entry; the first guiding slot, the second guiding slot, the third guiding slot, and the fourth guiding slot are parallel; when the sliding member is positioned in the first position, the first guiding entry and the third guiding entry are blocked by the sliding member to prevent the second guiding tab from entering the bracket, and the second guiding entry and the third guiding entry are capable of receiving the first guiding tab to mount two first data storage devices in the bracket.

7. The mounting structure of claim 6, wherein a first protruding portion and a second protruding portion are formed on the sliding member to block the first guiding entry and the third guiding entry in the first position, and a first cutout and a second cutout are defined in the sliding member to align with the second guiding entry and the fourth guiding entry in the first position.

8. The mounting structure of claim 6, wherein the sliding member is capable of sliding to a second position where the second guiding entry and the fourth guiding entry are blocked by the sliding member to prevent the first guiding tab from entering the bracket, and the first guiding entry and the third guiding entry are capable of receiving the second guiding tab to mount two second data storage devices in the bracket.

9. A mounting assembly for simultaneously mounting data storage devices with same types, the mounting assembly comprising:

a first data storage device, a first guiding tab formed on a side surface of the first data storage device;

a second data storage device different from the first data storage device, wherein a second guiding tab is formed on a side surface of the second data storage device; a height of first guiding tab from a bottom surface of the first data storage device is different than a height of the second guiding tab from a bottom surface of the second data storage device;

a bracket configured for receiving the first data storage device and the second data storage device, the bracket comprising a side wall, a first guiding slot defined in the side wall and extending to an edge of the side wall to define a first guiding entry and a second guiding slot defined in the side wall and extending to an edge of the side wall to define a second guiding entry; and a sliding member slidably attached to the side wall, wherein upon the condition that the sliding member is positioned in a first position, the first guiding entry is blocked by the sliding member to prevent the second guiding tab from entering the bracket, and the second guiding entry is capable of receiving the first guiding tab to mount the first data storage device in the bracket.

10. The mounting assembly of claim 9, wherein a flange is formed on an edge of the side wall; the first guiding entry and the second guiding entry are defined in the flange.

11. The mounting assembly of claim 10, further comprising a fastener, wherein the sliding member is attached to one side of the flange by the fastener.

12. The mounting assembly of claim 11, wherein a long guiding slot is defined in the flange to receive the fastener; the long guiding slot is configured for allowing the sliding member to slide along the slot.

13. The mounting assembly of claim 12, wherein a label is positioned on the flange adjacent to each distal end of the guiding slot.

14. The mounting assembly of claim 9, wherein a first protruding portion is formed on the sliding member to block the first guiding entry in the first position; a first cutout is defined in the sliding member to align with the second guiding entry in the first position.

15. The mounting assembly of claim 9, wherein a third guiding slot is defined in the side wall and extends to the edge to define a third guiding entry, a fourth guiding slot is defined in the side wall and extends to the edge to define a fourth guiding entry; the first guiding slot, the second guiding slot, the third guiding slot, and the fourth guiding slot are parallel;

when the sliding member is positioned in the first position, the first guiding entry and the third guiding entry are blocked by the sliding member to prevent the second guiding tab from entering the bracket, and the second guiding entry and the third guiding entry are capable of receiving the first guiding tab to mount two first data storage devices in the bracket.

16. The mounting assembly of claim 15, wherein a first protruding portion and a second protruding portion are formed on the sliding member to block the first guiding entry and the third guiding entry in the first position, and a first cutout and a second cutout are defined in the sliding member to align with the second guiding entry and the fourth guiding entry in the first position.

17. The mounting assembly of claim 15, wherein the sliding member is capable of sliding to a second position where the second guiding entry and the fourth guiding entry are blocked by the sliding member to prevent the first guiding tab from entering the bracket, and the first guiding entry and the third guiding entry are capable of receiving the second guiding tab to mount two second data storage devices in the bracket.

* * * * *